United States Patent Office 2,729,249
Patented Jan. 3, 1956

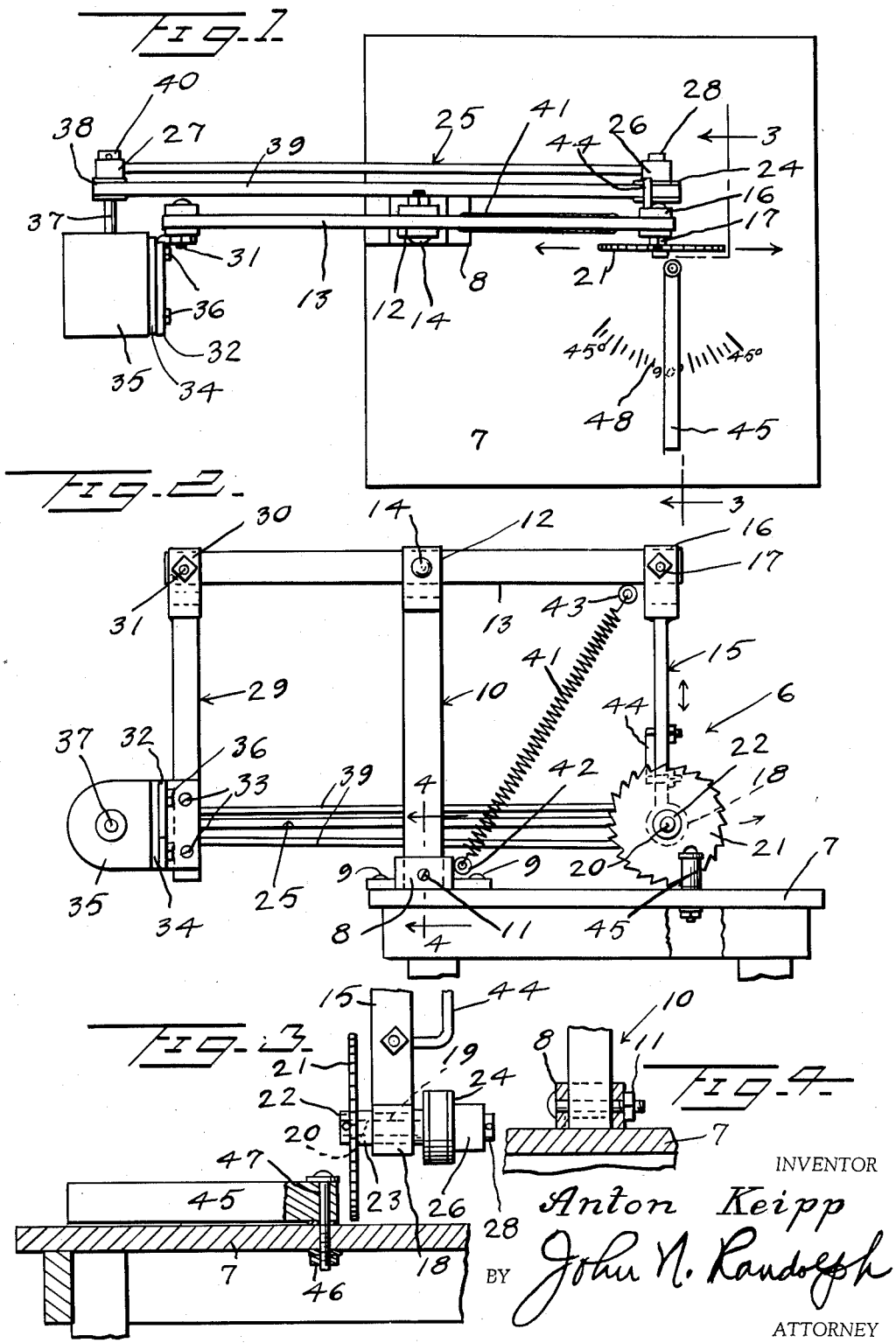

2,729,249

SWINGING PARALLELOGRAM LINKAGE POWER MITER SAW

Anton Keipp, Mansfield, Ohio

Application November 1, 1954, Serial No. 465,930

8 Claims. (Cl. 143—46)

This invention relates to a power miter saw of extremely simple construction including a novel support for the circular saw blade to permit the blade to be moved in a plurality of directions.

Another object of the invention is to provide a driven rotary type saw wherein the saw may be advanced relative to the work in a plurality of directions.

Still a further object of the invention is to provide a novel support for a rotary saw blade and for a motor for driving said saw blade whereby the saw blade and motor may be swung in a combination of directions for advancing the saw blade in different directions toward a workpiece.

Still a further object of the invention is to provide means for counterbalancing the weight of the motor to enable the rotary saw blade to be easily moved manually in selected directions for accomplishing a desired cutting operation.

Various other objects and advantages of the invention will hereinafter become more fully apparent from the following description of the drawing, illustrating a presently preferred embodiment thereof, and wherein:

Figure 1 is a top plan view of the power miter saw;

Figure 2 is a side elevational view thereof;

Figure 3 is an enlarged fragmentary detail view, partly in section and partly in end elevation, taken substantially along a plane as indicated by the line 3—3 of Figure 1, and Figure 4 is a fragmentary detail vertical sectional view, on an enlarged scale, taken substantially along a plane as indicated by the line 4—4 of Figure 2.

Referring more specifically to the drawing, the saw in its entirety and comprising the invention is designated generally 6 and includes a substantially horizontally disposed support member or base 7 which has been illustrated as a bench or table top but which could constitute merely a single flat member capable of being supported on any suitable surface. An upwardly opening socket member 8 is mounted on a part of the base or work support 7 and is secured thereto by suitable fastenings 9. A supporting post 10 has a lower end seating snugly in the socket 8 and which is detachably secured immovably therein by a nut and bolt fastening 11, the bolt of which extends through said socket 8 and the lower portion of the post 10, as best seen in Figure 4. The post 10 is thus detachably supported by the socket 8 in an upright position relatively to the base or work support 7. The post 10 is provided with a bifurcated upper end 12 in which is loosely received the intermediate portion of an elongated beam 13. The beam 13 is detachably connected to the post 10 and mounted for rocking movement in the bifurcated portion 12 thereof by a pivot means 14 such as a nut and bolt fastening, the bolt of which extends through the bifurcated portion 12 and through the intermediate part of the beam 13 and has a loose fitting engagement in one of the other of said parts to permit the beam 13 to rock in a vertical plane relative to the post 10.

An elongated blade supporting hanger 15 has a bifurcated upper end 16 loosely receiving one end of the beam 13. A pivot means 17, like the pivot means 14, extends through said beam end and the hanger portion 16 for swingably mounting the hanger on the beam for swinging movement in a vertical plane toward and away from the supporting post 10. The hanger 15 is provided at its lower end with a sleeve portion 18 which is disposed transversely of the longitudinal axis of the beam 13 and which may be lined with a sleeve or bushing 19 to provide a journal for an intermediate portion of a shaft 20. A circular type saw blade 21 is mounted on the shaft 20 adjacent one end thereof and on one side of the sleeve 18 and is detachably fixed thereto between a retaining collar 22, which is detachably secured to said shaft end, and a spacing sleeve or washer 23, which is disposed on the shaft between the saw blade 21 and sleeve 18. A belt pulley 24 is fixed to the shaft 20 on the other side of the sleeve 18. An elongated rigid connecting member 25 has eye portions 26 and 27 formed on the ends thereof. The eye 26 loosely engages around the shaft 20 outwardly of the pulley 24 and is retained thereon by a collar 28 which is secured to the last mentioned shaft end.

A motor supporting hanger, designated generally 29, comprises an elongated hanger member of substantially the same length as the hanger 15 and having a bifurcated upper end 30 in which the other end of the beam 13 is loosely received. The hanger 29 is pivotally connected to the last mentioned beam end 13 by a pivot fastening 31, corresponding to the pivot fastenings 14 and 17, for swinging movement of the hanger 29 in a plane corresponding to the plane of swinging movement of the hanger 15, relative to the beam 13. A bracket 32 is secured to the lower portion of the hanger 29 by fastenings 33 and projects laterally therefrom, so as to be disposed on the same side of the hanger 29 as the blade 21 is disposed relative to the hanger 15. The base 34 of a motor 35 is secured by fastenings 36 to the bracket 32 so that said motor is thus swingably supported on the hanger 29. The motor 35 preferably constitutes an electric motor and has an armature shaft 37 projecting from one end thereof across the hanger 29 and on the outer side thereof. A belt pulley 38 is secured to the armature shaft 37 in longitudinal alignment with the belt pulley 24 and an endless belt 39 is trained over said belt pulleys 24 and 38 for causing the shaft 20 to be driven by the motor shaft 37. The eye 27 of the rigid connecting member 25 is loosely mounted on the motor shaft 37 outwardly of the belt pulley 38 and between said belt pulley and a retaining collar 40, which is secured to the outer end of the shaft 37.

One end of a contractile coiled spring 41 is anchored to the socket 8 by an eye member 42, and the other end of said spring 41 is connected to the beam 13 by an eye member 43 which is secured to and depends from the beam adjacent the hanger 15, for urging said beam end and the hanger downwardly to counterbalance the weight of the motor 35 supported by the hanger 29 to thus cause the saw 6 to normally assume a substantially balanced position as illustrated in Figure 2.

A handle 44 is secured to the hanger 15 and projects laterally therefrom and is disposed above and adjacent the belt pulley 24.

An elongated bar 45 forms a work stop or fence and is disposed on the base or work support 7 to one side of the saw blade 21. A bolt of a nut and bolt fastening 46 extends loosely through a bore 47 which is formed near the end of the bar 45, which is located adjacent the blade 21, and said bolt extends through and is secured to the base 7. The stop or fence 45 is thus swingably mounted at an inner end thereof on the base 7 for swinging movement over a graduated part of the upper surface of the base 7 which contains degree markings and graduations, as seen at 48 in Figure 1, constituting a segment of a protractor scale and which is disposed on an arc concentric relative to the fastening 47.

From the foregoing it will be readily apparent that with the fastening 46 loosened the stop or fence 45 may be swung about said fastening as a pivot over the scale 48 to position the axis of the stop or fence at any desired angle relative to the plane of the saw blade 21. The fastening 46 can then be tightened to maintain the stop 45 at a desired angle relative to the saw blade 21. A workpiece, not shown, can then be disposed against a side of the stop 45 and so as to extend beyond the inner end thereof and across the plane of the blade 21.

Assuming that the motor 35 is operating to revolve the saw blade 21, the operator grasps the handle 44 to manipulate the saw 6. By exerting an upward pressure on the handle 44, the blade 21 can be displaced upwardly while the motor 35 will be moved downwardly due to the beam 13 rocking counterclockise about its pivot 14 as seen in Figure 2. The parts may then be swung in the opposite direction to displace the blade 21 downwardly for cutting the workpiece at a desired angle at which it is set by the stop 45 relative to the plane of the blade 21. Likewise, by exerting a pull or thrust on the handle 44, the hanger 15 can be swung on its pivot 17 relative to the beam 13 to either the left or right as seen in Figure 2 and due to the connection between the hangers formed by the connecting member 25, the hanger 29 will swing in unison with the hanger 15 relative to the beam. In this manner, the saw blade may be swung relative to the beam 13 toward or away from the workpiece. For example, if the blade 21 is displaced from its position of Figure 2 toward the post 10 it will tend to swing by gravity back to its position of Figure 2 to thus be readily fed into the workpiece. It will also be obvious that by manipulation of the handle 44 the blade 21 may be simultaneously swung about the two pivots 17 and 14 so as to move in any desired direction toward or away from the base 7 or parallel thereto, as for example directly toward or away from the post 10, directly toward or away from the base 7 or at various angles toward and away from the base 7. From the foregoing it will be readily apparent that the saw 6 can be accurately moved with little manual effort into engagement with a workpiece for cutting the workpiece to any desired miter or angle and to any desired depth.

Various modifications and changes are contemplated and may obviously be resorted to, without departing from the spirit or scope of the invention as hereinafter defined by the appended claims.

I claim as my invention:

1. A saw of the character described comprising a work support, a post secured to and extending upwardly from said work support, a beam pivotally mounted intermediate of its ends on an upper portion of said post for up and down rocking movement relative to the post, hangers swingably connected to end portions of said beam and depending therefrom, said hangers being swingable in a plane parallel to said beam, means connecting said hangers for swinging movement as a unit, a shaft journalled in the lower end of one of said hangers, a circular type saw blade fixed to said shaft and disposed in a plane substantially parallel to said beam, said blade being supported by the hanger, individual thereto, above said work support, and means for driving said saw blade connected to said shaft and including a motor supported by the other hanger.

2. A saw as in claim 1, and counterbalancing means connected to said beam for normally maintaining said beam in a position normal to the axis of said post.

3. A saw as in claim 2, said counterbalancing means comprising a contractile coiled spring cooperating with and acting against the weight of said motor.

4. A saw as in claim 1, a bracket fixed to said last mentioned hanger and disposed transversely of the axis of said beam and to which said motor is secured.

5. A saw as in claim 4, said motor having a drive shaft disposed parallel to said blade supporting shaft, and belt and pulley means forming a driving connection between said shafts.

6. A saw as in claim 1, and a handle connected to said first mentioned hanger and extending laterally therefrom in a direction away from the saw blade.

7. A saw as in claim 1, an elongated work stop disposed on said work support and having an inner end spaced laterally from and disposed adjacent the saw blade, and means swingably connecting said inner end of the work stop to the work support for positioning the work stop at different angles relative to the plane of the saw blade.

8. A saw as in claim 7, and a protractor scale disposed on said work support beneath said work stop and concentric to said swingable connecting means of the work stop for setting the work stop at selected angles relative to the plane of the saw blade.

References Cited in the file of this patent

UNITED STATES PATENTS

| | | |
|---|---|---|
| 1,057,180 | Snyder | Mar. 25, 1913 |
| 1,058,384 | Peters | Apr. 8, 1913 |
| 2,146,202 | Davenport | Feb. 7, 1939 |